July 12, 1960  F. J. SLOAN  2,944,295
FORMING CONTAINERS
Filed Oct. 29, 1957  2 Sheets-Sheet 1
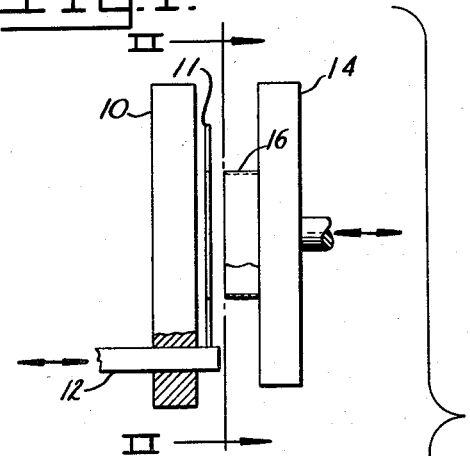
Fig.1.
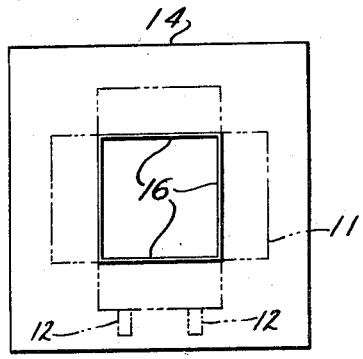
Fig.2.
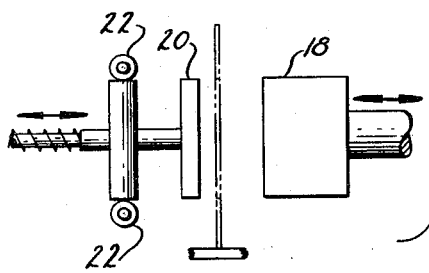
Fig.3.
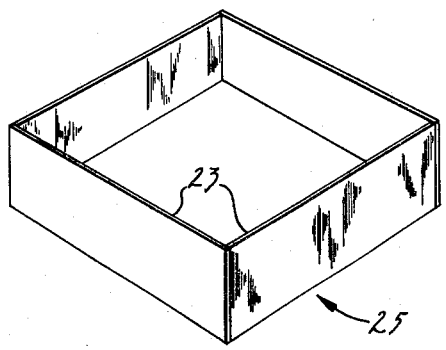
INVENTOR.
Francis J. Sloan
BY Chapin & Neal
ATTORNEYS July 12, 1960  F. J. SLOAN  2,944,295
FORMING CONTAINERS Filed Oct. 29, 1957  2 Sheets-Sheet 2

INVENTOR.
Francis J. Sloan
BY Chapin & Neal
ATTORNEYS

United States Patent Office 2,944,295
Patented July 12, 1960

2,944,295

FORMING CONTAINERS

Francis J. Sloan, Springfield, Mass., assignor to Package Machinery Company, East Longmeadow, Mass., a corporation of Massachusetts Filed Oct. 29, 1957, Ser. No. 693,183

3 Claims. (Cl. 18—56)

The present invention relates to the art of forming containers such as boxes, cartons, trays and the like.

The invention has for its object the provision of a novel method of forming containers from sheet material blanks, which method enables the economical use of materials which cannot be utilized by means of conventional methods to any practical extent.

A further and more general object of the invention is to reduce the amount of force required to form containers without permanently reducing the strength of the material itself to any substantial degree and additionally increasing the rate at which containers may be formed.

Included in the novel features of the invention is a method comprising the steps of temporarily reducing the strength of a blank of sheet material along a pattern of sharply defined lines and then folding the blank into container form about the thus weakened lines before the temporary condition of reduced strength ceases to exist.

There is also found a novel method of forming containers from oriented polystyrene or other plastics having like characteristics and which includes the steps of pressing a heated rule plate against a blank of oriented polystyrene to elevate the temperature thereof along sharply defined lines and thus provide temporarily weakened hinge lines, and then folding the blank into container form about said hinge lines before they cool and automatically return to substantially the same strength as the remainder of the blank material.

The above and other related objects and features of the invention will be apparent from a reading of the following specification, in which reference is made to the accompanying drawings, and the particular novelty thereof pointed out in the appended claims.

In the drawings,

Fig. 1 diagrammatically illustrates, in side elevation, mechanism employed in carrying out the invention;

Fig. 2 is a view taken on line II—II in Fig. 1;

Fig. 3 is a perspective view of the container formed by the mechanism of Fig. 1;

Figure 4:
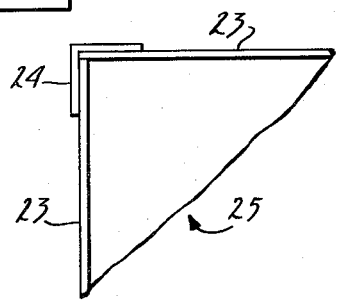
Fig. 4 is a fragmentary view of one corner of the container of Fig. 3 with a corner tab added.

The invention will first be described in relation to oriented polystyrene, a material having unique properties which have heretofore frustrated attempts to easily and readily utilize it as a container material. Oriented polystyrene is produced by simultaneously stretching a strip of stock both longitudinally and transversely in order to obtain the finished sheet material product. Oriented polystyrene and other oriented plastics, as used herein, are intended to mean plastics that have been so stretched and upon reheating to a critical temperature shrink in length and width to any extent several times their original dimensions.

Oriented polystyrene has properties which make it ideal as a packaging material and particularly as a container, since it is unusually rigid, with a highly polished surface and a transparency equivalent to that of the clearest glass. The rigidity of this material is so great that only a relatively thin sheet is required to obtain sufficient strength. This means that the amount of material and the resultant cost of containers formed thereof will be low enough to make their widespread use practical.

The desirability of using oriented polystyrene in this manner is obvious, however the physical treatment employed in its manufacture also gives it other properties which prevent its being handled according to conventional techniques of the container forming art. For one thing the material is molecularly laminar, and while it is of an apparently homogeneous cross section, it is very weak in a direction normal to its surface. This property is somewhat akin to the laminar formation of mica, although not so pronounced. Thus when a sheet is bent around a sharp corner, as is desired in forming containers, the material at the bend delaminates to a greater or lesser extent depending on the speed with which it is bent. If bent rapidly as would be necessary in any practical commercial process, the delamination is more extreme. An objectionable milky appearance occurs in the area of the bend and because of delamination is subject to tear along this milky fold line. These undesirable features can be minimized but not entirely eliminated by reducing the speed with which the bend is made, but to reduce speed makes commercial acceptance impossible.

A common expedient for facilitating the bending of plastics is to perform the bending operation at an elevated temperature. In the case of oriented polystyrene, a further unique property prevents the use of such a practice. It has been found that when the temperature of a sheet of said material is raised to a temperature of approximately 180° F., delamination and the resultant bad effects still persist. When heated above 180° F. and at about 185° F., a sudden critical temperature, i.e., distortion temperature exists at which the material begins to shrink, and in a very short time (a matter of seconds) the surface area of a heated piece of plastic will shrink to ⅛ its original dimension as the workpiece thickens.

The method disclosed herein to overcome these problems and thereby form containers from oriented polystyrene will now be described in detail. It is found preferable, though not a vital necessity, to provide a back-up plate 10 (Fig. 1) which is heated to the maximum non-distortion (or non-shrinking) temperature for oriented polystyrene which is about 180° F. A blank 11 of oriented polystyrene is placed on projections 12 which extend from the face of the heated plate 10 preferably above its lowermost edge. A rule plate 14 is mounted for reciprocable movement towards and away from the heated plate 10. The rules 16 (Fig. 2) of rule plate 14 are arranged in accordance with the pattern of lines about which the blank 11 is to be folded in forming a given type of container. The width of the blank-engaging edges of the rules 16 is maintained at a minimum, preferably ¹⁄₃₂ of an inch or less. The rule plate 14 is heated to a temperature which will bring the rules above the distortion temperature (about 185° F.) and preferably to the range of 225° F.

The rule plate 14 is then advanced towards the heated plate 10 to impress the rules 16 against the blank 11. The heated rules 16 are maintained against the blank 11, a relatively short time preferably in the order of ²⁄₁₀ of a second and then the rule plate is retracted. The blank 11 now has a definite pattern of hinge lines which have been weakened along sharply defined lines by the heated rules 16. While there may be some shrinkage of the blank material along these lines the blank still retains its original dimensions for all practical purposes. The important point, however, is that the material heated along this pattern of lines is relatively weak as compared with the strength of the blank itself and further when so weakened does not possess the laminar characteristics discussed above.

Thereafter, upon or during retraction of the rule plate 14, the projections 12 are retracted to permit the blank 11 to drop, under the influence of gravity, in front of container forming instrumentalities which may comprise a plunger 18 which is advanced to constrain the blank 11 against a resiliently mounted back-up plate 20. It is, of course, understood that the blank 11 could otherwise be transferred, as by mechanical means, to the folding instrumentalities. Preferably the dimensions of the plunger 18 match the pattern of hinge lines formed by the rules 16, which in turn define the bottom of the container to be formed. Continued advancement of the plunger forces the blank between rubber covered rolls 22 at either side and at the top and bottom thereof. These rolls fold the side flaps 23 of the blank about the hinge lines of reduced strength and against the plunger 18 to form the container 25 seen in Fig. 3. While not so shown the sides of the plunger 18 may at times be relieved to give a slight overfold to insure a 90° corner. The container 25, for illustrative purposes, is extremely simple and would probably require the addition of corner tabs 24, as seen in Fig. 4.

Figure 5:
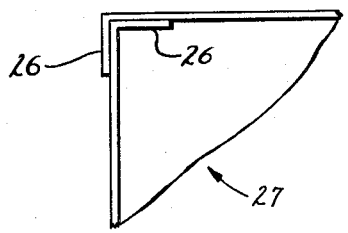
Fig. 5 is a fragmentary view of an alternate corner construction.

This same method of first forming disappearing hinge lines can be employed in forming any type of container of which I am aware. Illustrative of this is the corner construction of a container 27 which has been fabricated by this method (seen in Fig. 5) wherein the corner tabs 26 are integral with the side panels of the container.

Figure 6:
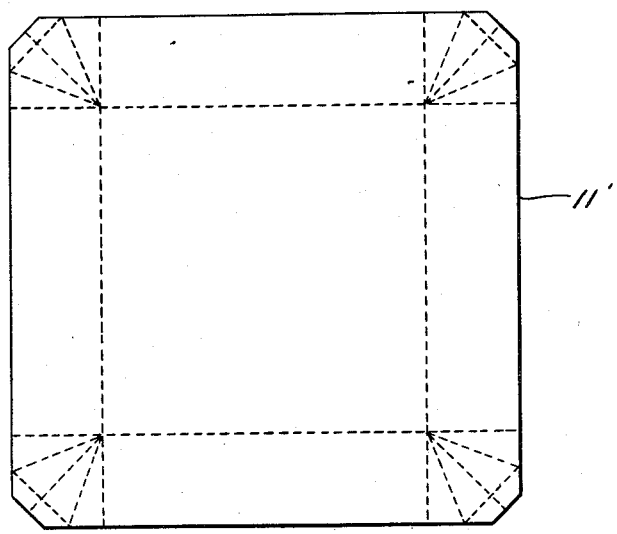
Fig. 6 shows an alternate blank.
Figure 7:
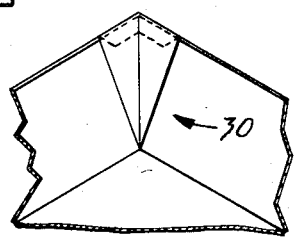
Fig. 7 is a perspective view of one corner of a container formed from the blank of Fig. 6.

The pattern of the hinge lines may be very complex as will be seen from the pattern of weakened lines in Fig. 6, on the blank 11′. When folded about these lines, as above taught (but using other appropriate folding instrumentalities), a corner construction, as at 30 (Fig. 7), will result.

It will be appreciated that the disappearing hinge lines of the present invention have all of the advantages of cut or crushed scores, as used in forming fiberboard boxes, insofar as the nature and shape of containers which can be formed. However, the present method provides several important and unique advantages over and beyond what can be obtained from conventional scoring. Among these advantages are the ability to fold the blank in either direction about a score line so formed, the ability to make the score line extremely weak so that the blank may be folded into container form at a faster rate and with less power required. Further, the hinge line is formed in such a manner that it automatically disappears and assumes the same, or at least substantially the original strength of the blank material. In the case of oriented polystyrene the strength of the plastic along the hinge lines, after cooling, is actually greater than the strength of the blank material.

The advantages listed above lead to the broader concepts of this invention. Thus the blank 11 in Fig. 1 need not necessarily be of oriented polystyrene. For example, such blank can be of aluminum or steel and also be advantageously treated in the manner taught above. In such case, the rule plate would be heated to a much higher temperature, remembering that the contact time is very short. The critical point would be to heat the sheet material to a temperature sufficient to substantially reduce the material's strength along the sharply defined lines of contact with the rules 16. In the case of most metals there is a fairly well defined break in the curve of heat plotted against strength giving a critical temperature above which it has been found advantageous to work. For aluminum this temperature is 600° F. and for steel 800° F. Preferably the heated plate 10 is at a temperature somewhat below the critical softening temperature of the blank 11 so that the sharply defined lines of softened blank material may be obtained from a short or momentary contact with the rule plate 14 and yet the blank as a whole will retain its original strength.

The sheet metal blank may then be released after these softened hinge lines are so formed and dropped to folding instrumentalities, duplicating the function of those seen in Fig. 1, to be shaped into container form. In passing it will be mentioned that the success of the present method, in some degree depends on the thinness of the sheet material. It is essential that the heat be transmitted through the thickness of the material without spreading by conduction in a lateral sense and destroy the sharply defined line of weakness.

While it may not seem necessary to reduce the strength of thin sheet material (perhaps only a few mils thick), this is deceiving. The high speeds of operation demanded for modern container forming machines multiplies the power requirements to astounding proportions with the result that the machine parts themselves must be made bigger and heavier. The present method substantially and dramatically reduces these power requirements enabling higher rates of operation with less power. Further, since the main portion of the blank retains its original strength the folding dies or instrumentalities need not have the high degree of precision usually required in forming sheet metal containers, this being associated with the fact that blank folds or swings readily about the sharply defined softened hinge line without requiring a great shaping force to guide the material.

To this point the discussion of disappearing hinge lines has been limited to the use of heat on heat softenable materials, however, other means may also be employed depending on the material which is to be formed into a container. Thus one can deal with a blank of cellulose acetate by impressing a pattern of acetone on the blank in the desired hinge line pattern for forming a given container. The acetate blank will be weakened along sharply defined lines and may then be readily folded thereabouts into container form. After the acetone evaporates the softened material returns at least substantially to its original strength.

The same principles can be employed in the case of a fiberboard blank. It has been found for such material that the pattern of weakened lines can be created by water or steam. The weakened blank can then be folded into container form after the fashion above described and upon evaporation of the water the weakened portions of the blank will return to at least substantially their original strength.

It will be appreciated that the weakened hinge lines, which could aptly be termed fugitive hinge lines, may be formed in many ways, dependent on the material which is to be shaped into container form. While it has been discovered that the time factor is quite critical for certain materials, other materials such as fiberboard softened with water can be handled in a comparatively leisurely manner, if desired.

Having thus described the invention what is declared as novel and desired to be secured by Letters Patent of the United States is:

1. The method of forming oriented plastic sheet material into container form comprising the steps of impressing a pattern of disappearing hinge lines on a blank of such material by simultaneously contacting one side of the blank with a plate heated to a temperature just below the distortion temperature of said material and contacting the other side of the blank with a rule plate having rules arranged in the desired pattern of the hinge lines, with the rules heated to a temperature above said distortion temperature, maintaining said contacting relation for a time sufficient for the blank to be weakened along sharply defined lines in contact with said rules and then folding the blank into container form about said weakened hinge lines before the weakened material cools and returns to substantially its original strength.

2. The method of forming oriented polystyrene sheet material into container form comprising the steps of impressing a pattern of disappearing hinge lines on a blank of such material by simultaneously contacting one side of the blank with a plate heated to about 180° F. and contacting the other side of the blank with a rule plate having rules arranged in the desired pattern of the hinge lines, with the rules heated to a temperature of about 225° F., maintaining the first-named plate and the rule plate in contact with the blank for about $2/10$ of a second, then releasing the blank, and then folding the blank into container form about said hinge lines within ½ second from the time the blank is released by the rule plate.

3. The method of forming oriented polystyrene sheet material into container form, comprising the steps of producing a pattern of disappearing hinge lines on a blank of such material by positioning the blank on supporting means in front of a plate which is heated to about 180° F., contacting one side of the blank with said plate and the other side of said blank with a rule plate having rules arranged thereon in the desired pattern for the hinge lines and heated to a temperature of about 225° F., releasing the blank from this contacting relation after about $2/10$ of a second, retracting said supporting means to allow the blank to drop under the influence of gravity to container forming instrumentalities and then folding said blank with said instrumentalities about said hinge lines into container form within ½ second of the time it was released by the rule plate.

References Cited in the file of this patent

UNITED STATES PATENTS

| | | |
|---|---|---|
| 2,487,495 | Taber | Nov. 8, 1949 |
| 2,627,629 | Triolo | Feb. 10, 1953 |
| 2,843,027 | Sevison | July 15, 1958 |

OTHER REFERENCES

Plastics Engineering Handbook (The Society of the Plastics Industry), published by Reinhold Publishing Corp., New York, 1954 (pages 133, 146–150 relied on). (Copy in the Scientific Library and Div. 15.)